May 16, 1933.  L. FOGLEIN  1,908,861
MOLD FOR GLASSWARE
Filed April 16, 1932  2 Sheets-Sheet 1
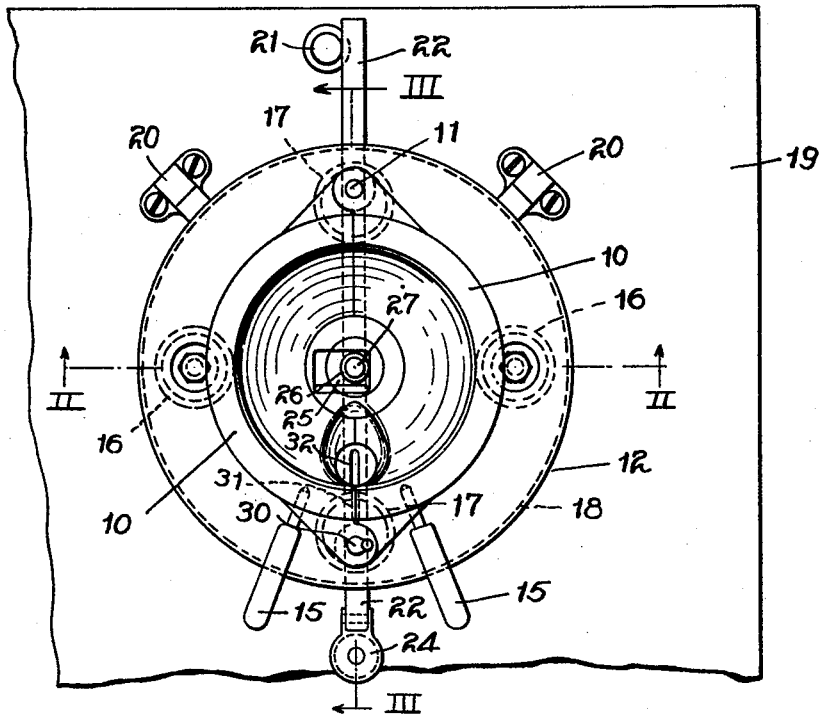
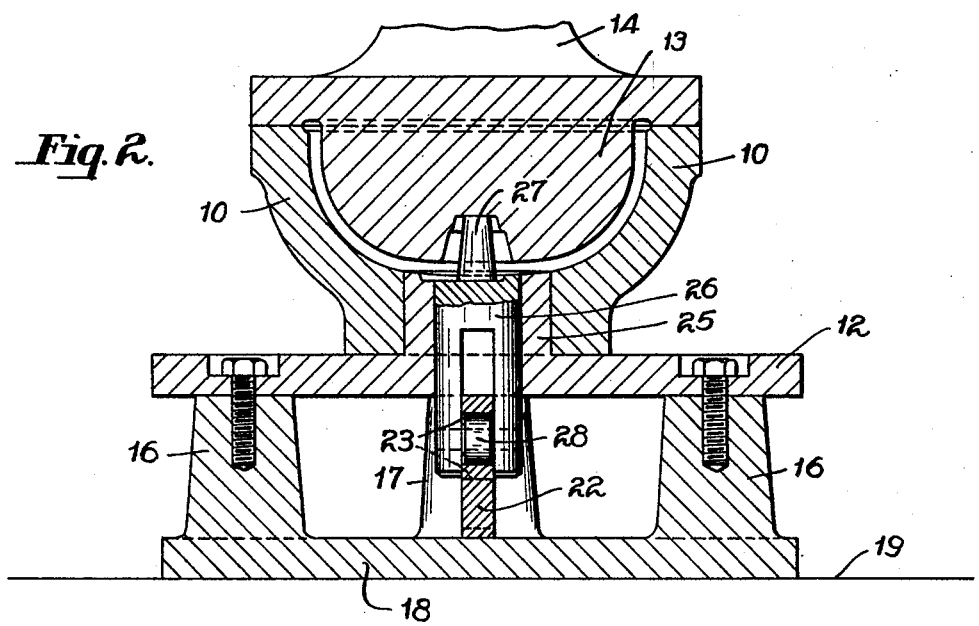
INVENTOR
Louis Foglein,
By Archworth Martin,
Attorney.

May 16, 1933.  L. POGLEIN  1,908,861
MOLD FOR GLASSWARE
Filed April 16, 1932  2 Sheets-Sheet 2

INVENTOR
Louis Poglein,
By Archworth Martin,
Attorney.

Patented May 16, 1933

1,908,861

UNITED STATES PATENT OFFICE

LOUIS POGLEIN, OF JEANNETTE, PENNSYLVANIA, ASSIGNOR TO McKEE GLASS COMPANY, OF JEANNETTE, PENNSYLVANIA, A CORPORATION OF PENNSYLVANIA

MOLD FOR GLASSWARE

Application filed April 16, 1932. Serial No. 605,654.

My invention relates to molds, and more particularly to molds that are especially adapted for the manufacture of irregularly-shaped articles, such as fruit juice extractor bowls and the like.

One object of my invention is to provide an improved means for centering the alining molds with respect to a presser plunger.

Another object of my invention is to provide an improved means for pre-forming an upstanding central sleeve or perforated boss in a glass article.

Still another object of my invention is to provide means for effecting extrusion of surplus glass during the forming of the spout of a juice extractor bowl.

A further object of my invention is to provide a generally simplified and improved apparatus for forming fruit juice extractor bowls and the like.

Figure 3:
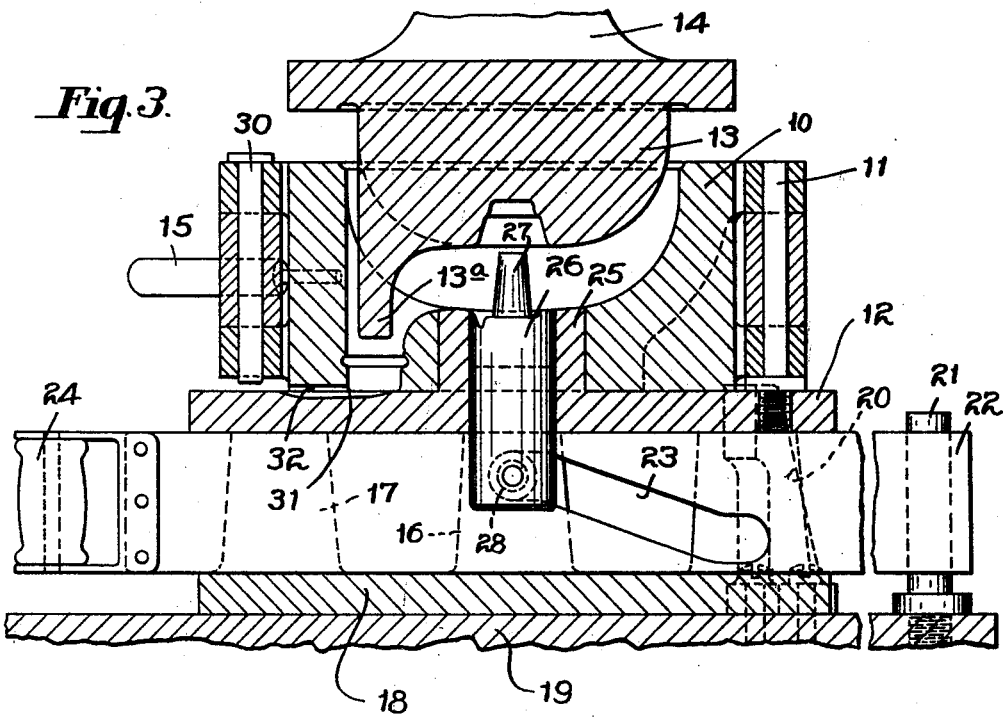

One form which my invention may take is shown in the accompanying drawings, wherein Figure 1 is a plan view of a mold; Fig. 2 is a view taken on the line II—II of Fig. 1; Fig. 3 is a view taken on the line III—III of Fig. 1, and Fig. 4 is a view showing the bowl formed in the mold of Figs. 1 to 3.

Figure 4:
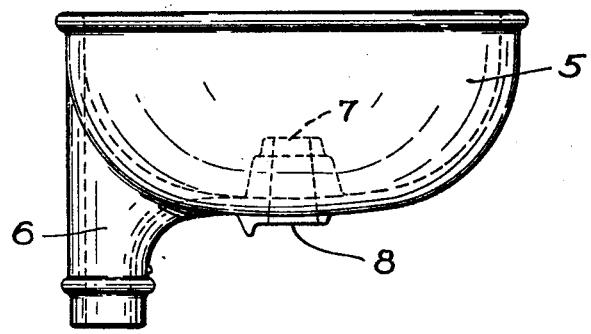

The contours of the molding surfaces will be better understood by first referring to the completed article of Fig. 4, which represents a juice extractor bowl 5 having a spout 6, a centrally-disposed perforated boss or sleeve 7, and a downwardly-extending portion 8 of generally rectangular form.

The bowl is intended to be applied to reaming mechanism, the sleeve 7 serving to receive a bearing through which a shaft extends and carries at its upper end a reamer, the bowl 5 being held against rotation by the depending boss 8 that fits in a stationary pocket of the reaming apparatus. The spout 6 is provided for conducting the fruit juices to a receptacle.

The mold structure consists primarily of half-mold sections 10 that are pivotally connected at 11 to a bottom plate 12, in somewhat the usual manner, and includes a mold plunger 13 that is carried by a vertically-reciprocable plunger head 14 that is raised and lowered in any suitable manner, well-known in the art, to compress and shape a charge of glass within the mold sections 10. The half molds 10 are opened and closed by means of handles 15.

The bottom plate 12 is mounted on posts 16 and 17 extending upwardly from a bed plate 18 that is loosely supported on a base 19. A pair of stop members 20 are secured to the base 19 and project upwardly to engage and center the bottom plate 12, with the mold in glass-pressing position beneath the presser head 14. A third stop 21 extends upwardly from the base 19 in position to be engaged by a slide bar 22 which extends through the slotted posts 17 and is provided with a camming slot 23 and a handle 24.

The plate 12 is provided with an upstanding central portion 25 that forms part of the mold bottom when the mold sides 10 are closed. A central plunger 26 has vertical movement within the member 25 and carries at its upper end a tapered pin-like extension 27 that is utilized for forming the sleeve 7, as hereinafter explained.

The lower portion of the plunger 26 is slitted and has a roller 28 journalled between the walls of the slot, the roller lying within the slot 23 of the slide bar 22, so that when the bar 22 is moved forwardly and backwardly, the plunger 26 will be lowered and raised.

The operation of the mold is as follows:—

The mold sides 10 are locked in closed position by a pin 30 that extends through bosses at the forward edges of these mold sections. The plunger 26 being in raised position, and the bed plate 18 pulled outwardly, so that the mold is away from the mold plunger 13, a charge of glass is introduced into the mold whereupon the mold is pushed back until the plate 12 engages the stops 20, and the handle 24 is swung to rotate the mold until the bar 22 engages the stop 21. The mold is then properly centered beneath the presser head 14. This is, of course, important, because the mold cavity in which the spout 6 of the bowl is formed must be in exact alinement with the extension 13a of the mold plunger 13. If, when the plate 12 engages the stops 20, the bar 22 is not positioned against the stop 21, the handle 24 can be pushed to rotate the mold on its axis until the bar 22 engages the stop 21.

The presser head 14 is then brought down, and the charge of glass shaped to the contour shown in Fig. 7. There is likely to be an excess of glass at the lower end of the spout 6, and to care for this excessive glass, I provide an overflow opening consisting of a depression 31 formed in the plate 12, and small grooves 32 in the adjacent corners of the mold sides 10.

The handle 24 is then drawn outwardly to move the plunger 26 down into position below the extension 8 of the bowl 5, and the presser head 14 raised. By this time, the glass within the mold will be sufficiently set to permit of opening the mold sides 10 and removing the article.

Any extruded portion of the glass which adheres to the lower front edge of the spout through overflow into the cavities 31 and 32 is, of course, then broken off of the bowl. Also, there may be a thin web of glass across the upper end of the sleeve 7, formed by the plunger 26, which must be broken out.

I claim as my invention:—

1. Mold structure comprising a bottom plate, a mold carried by the plate, a presser, a base for slidably supporting the bottom plate, a pair of stops on the base, for engaging the bottom plate and alining the mold sides beneath the presser, a third stop on the base, a bar carried by the mold plate, and means for rotatably positioning the mold plate while in engagement with said pair of stops, to bring the said bar into abutting engagement with the third stop.

2. Mold structure comprising a bottom plate, a mold carried by the plate, a presser, a base for slidably supporting the bottom plate, a pair of stops spaced apart in a direction circumferentially of the mold, for alining the mold beneath the presser head, a third stop surface, and a radially-extending projection carried by the mold in position to be moved against the third stop when the mold is in engagement with the said pair of stops and is rotated in one direction about its axis.

3. Mold structure comprising a mold body composed of half sections, a presser having a recess in its underside, a plunger movable through the bottoms of the half sections and into said recess, and a slide bar having camming engagement with said plunger to raise and lower the same.

4. Mold structure comprising a mold body composed of half sections, a presser having a recess in its underside, a plunger movable through the bottoms of the half sections and into said recess, a slide bar having camming engagement with said plunger to raise and lower the same, a pair of stop members spaced apart in directions circumferentially of the mold sections, and a third stop member, the third stop member being positioned to be engaged by the side of the said bar when the mold sections have engagement with the first-named stop members, the mold sections and body being movable as a unit relative to the presser, in a horizontal plane.

5. Mold structure comprising a mold body composed of half sections, a presser having a recess in its underside, a plunger movable through the bottoms of the half sections and into said recess, a slide bar having an inclined camming surface extending in the same general direction as the bar, a camming member carried by said plunger and engaging the said surface to raise the plunger when the bar is pushed rearwardly, stop means for engaging the mold sections and positioning them in a radial direction with respect to the presser, and a stop member positioned to be engaged by the said bar when the bar is in its rearmost position, to provide for circumferential positioning of the mold sections relative to the presser.

6. Mold structure comprising a presser, split mold sections forming a mold cavity which has an extended recess for forming a spout on an article, a projection on the presser extending into said recess, and a bottom plate beneath the mold sections, the said plate having an overflow cavity formed in said plate at a point adjacent to and communicating with the said recess.

7. Mold structure comprising a presser, split mold sections forming a mold cavity which has an extended recess for forming a spout on an article, a projection on the presser extending into said recess, and a bottom plate beneath the mold sections, the mold sections being cut away adjacent to the bottom plate and adjacent to the lower end of said recess, to provide an overflow cavity.

8. Mold structure comprising a presser, split mold sections forming a mold cavity which has an extended recess for forming a spout on an article, a projection on the presser extending into said recess, and a bottom plate beneath the mold sections and closing the lower end of said recess, the said plate having an overflow cavity formed therein at a point adjacent to and communicating with the said recess.

9. Mold structure comprising a convex presser having a centrally-disposed recess in its underside, and provided with a downwardly-extending projection adjacent to one side face thereof, a mold body having a cavity co-operating with the said presser and provided at one side with a recess extending downwardly from said cavity adjacent to one side thereof, for cooperation with said projection, and a vertically movable plunger extending through the central portion of the mold cavity for cooperation with the first-named recess, the said projection and plunger being adapted to form a discharge spout and a central bushing respectively, on an article formed within the mold.

10. Mold structure comprising a presser, split mold sections forming a mold cavity which has an extended recess for forming a spout on an article, the said recess being radially offset from the center of the mold cavity, and extending in a direction generally parallel to the axis of the said cavity, and a projection on the presser extending into the said recess.

11. Mold structure comprising a presser, a mold body having a cavity which has an extended recess for forming a spout on an article, the said recess being radially offset from the center of the mold cavity, and extending in a direction generally parallel to the axis of the said cavity, and a projection on the presser extending into the said recess.

12. Mold structure comprising a presser, split mold sections forming a mold cavity which has an extended recess for forming a spout on an article, a projection on the presser extending into said recess, and means constituting an overflow cavity which has communication with said extended recess.

In testimony whereof I, the said Louis Poglein have hereunto set my hand.

LOUIS POGLEIN.